United States Patent [19]
Frank et al.

[11] Patent Number: 6,083,619
[45] Date of Patent: Jul. 4, 2000

[54] COMPOSITE MATERIAL CONTAINING AEROGEL, PROCESS FOR ITS PREPARATION, AND ITS USE

[75] Inventors: Dierk Frank, Hofheim; Andreas Zimmermann, Griesheim; Helmut Stuhler, Nürnberg, all of Germany

[73] Assignee: Hoechst Aktiengesellschaft, Frankfurt, Germany

[21] Appl. No.: 08/836,935

[22] PCT Filed: Nov. 22, 1995

[86] PCT No.: PCT/EP95/04600

§ 371 Date: May 21, 1997

§ 102(e) Date: May 21, 1997

[87] PCT Pub. No.: WO96/15998

PCT Pub. Date: May 30, 1996

[30] Foreign Application Priority Data

Nov. 23, 1994 [DE] Germany .............................. 44 41 568

[51] Int. Cl.⁷ .............................. B32B 5/16; B32B 13/02
[52] U.S. Cl. ..................... 428/331; 428/36.5; 428/294.7; 428/323; 264/638; 264/640
[58] Field of Search ..................... 428/446, 454, 428/304.4, 306.6, 307.3, 36.5, 312.6, 317.9, 331, 323, 294.7; 156/244.1; 264/6, 13, 623, 638, 642, 640

[56] References Cited

U.S. PATENT DOCUMENTS

| | | | |
|---|---|---|---|
| 3,965,020 | 6/1976 | Noll et al. | 252/62 |
| 4,230,765 | 10/1980 | Takahashi et al. | 428/283 |
| 4,399,175 | 8/1983 | Kummermehr et al. | 428/76 |
| 4,954,327 | 9/1990 | Blount | 423/338 |
| 5,122,291 | 6/1992 | Wolff et al. | 252/62 |
| 5,137,927 | 8/1992 | Wolff et al. | 521/51 |
| 5,294,480 | 3/1994 | Mielke et al. | 428/240 |
| 5,306,555 | 4/1994 | Ramamurthi et al. | 428/289 |
| 5,569,513 | 10/1996 | Fidler et al. | 428/35.6 |

FOREIGN PATENT DOCUMENTS 0672635   9/1995   European Pat. Off. .

*Primary Examiner*—Timothy M. Speer
*Assistant Examiner*—Stephen Stein
*Attorney, Agent, or Firm*—Frommer, Lawrence & Haug LLP

[57] ABSTRACT

An inorganic material comprising an aerogel, a process for its preparation, and its use. The invention relates to a composite material comprising from 10 to 95% by volume of aerogel particles whose particle diameter is less than 0.5 mm and a phyllosilicate as inorganic matrix material.

14 Claims, No Drawings

COMPOSITE MATERIAL CONTAINING AEROGEL, PROCESS FOR ITS PREPARATION, AND ITS USE

The invention relates to a composite material comprising from 10 to 95% by volume of aerogel particles and a phyllosilicate as inorganic matrix material, a process for its preparation, and its use.

Most non-porous, inorganic solids have relatively high thermal conductivity, since heat is conducted efficiently through the solid material. In order to achieve lower thermal conductivities, porous materials, e.g. based on vermiculites, are often used. In a porous body, there remains only a solid framework which can transmit heat efficiently, whereas the air in the pores, in comparison with the solid body, transmits less heat.

However, pores in a solid generally lead to a deterioration in its mechanical stability, because stresses can be transmitted only through the framework. Therefore, porous, but still mechanically stable materials also have relatively high thermal conductivity.

For many applications, however, a very low thermal conductivity in conjunction with good mechanical strength, i.e. high compressive and flexural strengths, is desirable. Firstly, shaped articles need to be machined, secondly, depending on the application, they must be able to withstand mechanical loads without fracture or cracking, even at elevated temperatures.

Because of their very low density, high porosity and small pore diameter, aerogels, especially those having porosities greater than 60% and densities less than 0.6 g/cm$^3$, have extremely low thermal conductivities and therefore find application as heat-insulating materials, as described in EP-A-0 171 722. The small pore diameters, less than the mean free path of air molecules, are particularly important for low thermal conductivity, since they give rise to a lower thermal conductivity for the air in the pores than for air in macropores. Therefore, the thermal conductivity of aerogels is even smaller than that of other materials having similar porosity values but larger pore diameters, such as e.g. foams or materials based on vermiculites.

However, the high porosity also gives rise to relatively low mechanical stability, both of the gel from which the aerogel is dried and also of the dried aerogel itself.

Because of their low density, aerogels have, depending on the density, exceptionally low dielectric constants having values between 1 and 2. Aerogels are therefore also predestined for electronic applications, for example for high-frequency applications (S. C. W. Hrubesh et al., J. Mater. Res. Vol. 8, No. 7, 1736–1741).

In addition to the abovementioned mechanical disadvantages of aerogels, it is very disadvantageous for electronic applications if the dissipation factor is high.

Aerogels in the widest sense, i.e. in the sense of "gels containing air as dispersion medium" are produced by drying a suitable gel. The term "aerogel" in this sense includes aerogels in the narrower sense, xerogels and cryogels. A dried gel is referred to as an aerogel in the narrower sense if the gel liquid is removed at temperatures above the critical temperature and starting from pressures above the critical pressure. If, by contrast, the gel liquid is removed subcritically, for example with formation of a liquid-vapor boundary phase, the resulting gel is often also referred to as a xerogel. It should be noted that the gels according to the invention are aerogels in the sense of gels containing air as dispersion medium.

For many applications, it is necessary to use the aerogels in shaped articles having adequate mechanical stability.

EP-A-0 340 707 discloses an insulating material having a density of from 0.1 to 0.4 g/cm$^3$ comprising at least 50% by volume of silica aerogel particles having a diameter between 0.5 and 5 mm, bound together by at least one organic and/or inorganic binder. The comparatively course particle size has the result that shaped articles produced from the insulating material have an inhomogeneous distribution of the aerogel material. This applies especially if the smallest typical dimensions of the shaped articles, which is the thickness in films or sheets, is not very much greater than the typical diameter of aerogel particles. Especially at the perimeters, an increased binder proportion would be necessary, which would have an adverse effect on the thermal conductivity and on the dielectric properties of the shaped article, particularly at the surface.

Electronic applications in particular require especially thin layers (from 0.01 to 2.0 mm), which cannot be prepared using the abovementioned aerogel particles.

Furthermore, in a shaped article made from this insulating material, regions of low mechanical stability with diameters between 0.5 and 5 mm and comprising aerogel material would appear at the surface and, under mechanical load, could eventually give rise to surface irregularities with diameters or depths up to 5 mm through destruction of the aerogels at the surface.

In addition, it is not easy to prepare insulating materials of this type which include only a small proportion of liquid, since, in the processes indicated in EP-A-0 340 707, the aerogel particles, because of their low mechanical strength, can easily be destroyed by shearing processes during mixing.

The object of the invention is therefore to provide a composite material based on aerogels which has low thermal conductivity and high mechanical strength.

A further object of the present invention is to provide a composite material having a dielectric constant of less than 3 and also, associated with this, a low dissipation factor.

These objects have been achieved by means of a composite material comprising from 10 to 95% by volume of aerogel particles and at least one inorganic matrix material, wherein the particle diameter of the aerogel particles is less than 0.5 mm and the inorganic matrix material is a phyllosilicate which may be fired or unfired.

The matrix material(s) form(s) a matrix which binds the aerogel particles and extends as continuous phase through the entire composite material.

The phyllosilicates can be naturally occurring phyllosilicates, such as kaolins, clays or bentonites, synthetic phyllosilicates, such as magadiite or kenyaite, or mixtures of these.

Preference is given to phyllosilicates which contain as little alkali metal as possible and at the same time have high formability. Particular preference is given to the corresponding clays or synthetic alkali-metal-free (sodium-free) phyllosilicates, e.g. magadiite.

Depending on the application, it may be advantageous if the composite material and/or the phyllosilicate within it is fired. The firing temperature is selected so that the water of crystallization is driven off (T>550° C.). In this case, the two-layer silicate kaolin is, for example, converted to metakaolin. This gives rise to a porosity which is desirable for applications as heat insulator.

Furthermore, the composite material may also contain inorganic binders, such as, for example, gypsum, lime and/or cement, in which case the proportion of the inorganic binders, based on the proportion of phyllosilicate, is preferably less than 50% by weight.

The inorganic binders, for example cement, lime, gypsum or suitable mixtures thereof, in combination with phyllosilicates, constitute an excellent basis for the production of shaped articles from aerogel. Hydraulic setting gives a very fine structure of high strength. The combination of phyllosilicate, inorganic binders and aerogel gives the shaped article properties which are exactly those which are desired for applications e.g. in the building sector.

Mixtures of phyllosilicates and inorganic binders are also suitable for casting. The phyllosilicates regulate the rheological properties of such aqueous mixtures.

At an aerogel particle content of significantly below 10% by volume in the composition, the advantageous properties of the composition would, because of the low proportion of aerogel particles, to a large extent be lost. Compositions of this type would no longer have low densities and thermal conductivities. The dielectric constant would rise to values at which the shaped articles would be unsuitable, for example, for high-frequency applications.

An aerogel particle content of significantly greater than 95% by volume would give a matrix material content of less than 5% by volume, which is too low to ensure adequate binding of the aerogel particles with one another and adequate mechanical compressive and flexural strength.

The proportion of aerogel particles is preferably in the range from 20 to 90% by volume.

Suitable aerogels for the novel composite material are those based on metal oxides which are suitable for the sol-gel technique (C. J. Brinker, G. W. Scherer, Sol-Gel Science, 1990, chapters 2 and 3), such as, for example, silicon or aluminum compounds, or those based on organic substances which are suitable for the sol-gel technique, such as melamine-formaldehyde condensates (U.S. Pat. No. 5,086,085) or resorcinol-formaldehyde condensates (U.S. Pat. No. 4,873,218). They can also be based on mixtures of the abovementioned materials. Preference is given to aerogels comprising silicon compounds, in particular $SiO_2$ aerogels and very particularly preferably $SiO_2$ xerogels. To reduce the radiative contribution to thermal conductivity, the aerogel can include IR opacifiers, such as, for example, carbon black, titanium dixoide, iron oxides or zirconium dioxide, or mixtures thereof.

In a preferred embodiment, the aerogel particles have hydrophobic surface groups. Groups suitable for permanent hydrophobization are trisubstituted silyl groups of the formula —$Si(R)_3$, preferably trialkyl- and/or triarylsilyl groups, where each R is independently an unreactive organic radical, such as $C_1$–$C_{18}$-alkyl or $C_6$–$C_{14}$-aryl, preferably $C_1$–$C_6$-alkyl or phenyl, in particular methyl, ethyl, cyclohexyl or phenyl, which additionally may also be substituted with functional groups. Trimethylsilyl groups are particularly advantageous for permanent hydrophobization of the aerogel. These groups can be introduced as described in WO 94/25149 or by gas phase reaction between the aerogel and, for example, an activated trialkylsilane derivative, such as for example a chlorotrialkylsilane or a hexaalkyldisilazane (cf. R. Iler, The Chemistry of Silica, Wiley & Sons, 1979). The hydrophobic surface groups prepared in this way furthermore reduce the dissipation factor and the dielectric constant in comparison with OH groups. Aerogel particles having hydrophilic surface groups may absorb water, depending on the atmospheric humidity, so that the dielectric constant and dissipation factor can vary with atmospheric humidity. This is frequently undesirable for electronic applications. The use of aerogel particles having hydrophobic surface groups prevents this variation, since no water is adsorbed.

The selection of the radicals also depends on the typical application temperature.

According to the invention, the particle diameter of the aerogel particles is less than 0.5 mm, preferably less than 0.2 mm. For electronic applications, the diameter can be significantly smaller still, but is preferably greater than 0.1 $\mu$m. The particle diameter refers to the mean diameter of the individual aerogel particle, since the method of preparation of the aerogel particles, for instance by milling, means that they need not necessarily have a spherical shape.

The use of small aerogel particles at the same aerogel proportion gives improved mechanical stability with respect to formation of fractures and cracks, since local build-up of stresses under load is reduced.

In addition, small aerogel particles give a homogeneous distribution within the composition, so that the composite material has an almost uniform thermal conductivity and dielectric constant at all points, in particular even at the surfaces.

Aerogels, depending on the material and on the type of surface groups on the pore surfaces, can be hydrophilic or hydrophobic. If hydrophilic aerogels come into contact with polar materials, in particular water, in vapor or liquid form, the pore structure may become weakened, depending on the duration of the action and on the physical condition of the material; in unfavorable cases, a hydrophilic aerogel may even collapse. This alteration of the pore structure, in particular a collapse, may give rise to a drastic deterioration in the thermal insulation efficiency. Taking into consideration the possible presence of moisture (as water) in the composite material, for example as a result of condensation of atmospheric moisture during temperature changes, and the production process, which typically involves water, hydrophobic aerogels are therefore preferred. In order to avoid a deterioration in the insulation efficiency of the composite material under the influence of moisture and/or of the ambient atmosphere during the long service life which is expected of shaped articles typically produced from the composite material, aerogels which remain hydrophobic over long periods of time, even in slightly acid environments, are particularly preferred.

When aerogel particles having hydrophobic surface groups are used, the use of very small particle diameters gives a hydrophobic ceramic material, since the hydrophobic aerogel has a uniform and very fine distribution.

A particularly high proportion of aerogel particles in the composite material can be achieved by using a bimodal distribution of the particle sizes.

It is also the case that the thermal conductivity of the aerogels decreases with increasing porosity and with decreasing density. For this reason, aerogels having porosities greater than 60% and densities less than 0.6 g/cm$^3$ are preferred. Aerogels having densities less than 0.4 g/cm$^3$ are particularly preferred.

In order to reduce the radiative contribution to the thermal conductivity, the composite material can include IR opacifiers, such as, for example, carbon black, titanium dioxide, iron oxides or zirconium dioxide, or mixtures of these; this is particularly advantageous for applications at elevated temperatures.

In relation to cracking and to breaking strength, it can also be advantageous if the composite material contains fibers. The fibers can be organic fibers, such as polypropylene, polyester, nylon or melamine-formaldehyde fibers, and/or inorganic fibers, such as, for example, glass fibers, mineral or SiC fibers, and/or carbon fibers. Organic fibers cannot be used if the shaped article is annealed.

The flammability classification of the composite material obtained after drying is determined by the flammability classification of the aerogel and of the inorganic matrix material and, if used, of the fiber material. In order to obtain the best possible flammability classification for the composite material (low flammability or non-combustible), the fibers should consist of incombustible material, for example mineral, glass or SiC fibers.

In order to avoid an increase in thermal conductivity caused by the added fibers, a) the proportion by volume of the fibers should be from 0.1 to 30%, preferably from 1 to 10%, and b) the thermal conductivity of the fiber material should preferably be <1 W/mK.

By means of a suitable choice of fiber diameter and/or fiber material, the radiative contribution to the thermal conductivity can be reduced and an increased mechanical strength can be achieved. For these purposes, the fiber diameter should preferably be in the range from 0.1 to 30 $\mu$m. The radiative contribution to the thermal conductivity can be especially reduced if carbon fibers or carbon-containing fibers are used.

The mechanical strength can also be influenced by the length and distribution of the fibers in the composite material. The use of fibers having a length between 0.5 and 10 cm is preferred. For sheet-like shaped articles, fabrics composed of fibers may also be used.

The composite material may also contain other auxiliary materials, such as, for example, tylose, starch, polyvinyl alcohol and/or wax emulsions. These materials are used as extrusion aids during the production of the composite material. In the prior art, they are employed industrially in the forming of ceramic bodies.

The dielectric constant of the composite material should, in particular for electronic applications, preferably be less than 3. Such a composite material is then suitable for applications in the frequency range above 1 GHz, since the capacitance of the composite material remains negligibly low.

If the material is used in the form of sheet-like structures, for example sheets, it can be laminated on at least one side with at least one covering layer, in order to improve the properties of the surface, for example to increase wear resistance, to make the surface a vapor barrier or to protect it from easily becoming soiled. Covering layers can also improve the mechanical stability of articles made from the composite material. If covering layers are used on both surfaces, these may be the same or different.

Suitable covering layers are all the materials known to the person skilled in the art. They may be non-porous and thus effective as a vapor barrier; examples are plastic films, metal foils or metallized plastic films which reflect heat radiation. Porous covering layers, which permit the ingress of air into the material and thus give better sound insulation, can also be used; examples are porous films, papers, fabrics and webs. The matrix material itself can also be used as covering layer.

The covering layers may themselves also comprise a number of layers, and may be secured using the binder or using another adhesive.

The surface of the composite material can also be sealed and consolidated by the introduction into a surface layer of at least one suitable material.

A further object of the present invention is to provide a process for preparation of the novel composite material.

This object is achieved by a process which comprises a) mixing the aerogel particles, the phyllosilicate, the water and, if desired, fibers, binders and/or auxiliary materials in a mixing device, b) subjecting the mixture thus obtained to a shaping process, c) drying the body thus obtained, d) if desired, subjecting the dried body to green machining, and e) subjecting the machined and/or dried body, if desired, to heat treatment at a temperature in the range from 250 to 1200° C.

It is preferable, in step a), to precharge the solid constituents into the mixing device and then to add the liquid constituents.

It is particularly preferable to add a wax emulsion having a water content of about 50% onto the dry starting weight of solid constituents. A further part of the necessary moisture can be achieved by adding waterglass. Additional water can be added to the mixture to the extent that this is necessary.

The content of mixing water can be used to modify the mechanical properties of the mixture. The characteristic Theological behavior of the mixture is also determined by the type, amount and combination of fibers, binders and/or auxiliary materials in interaction with the properties of the aerogel particles and of the phyllosilicate.

This mixture is preferably compounded in a mixer which exerts shearing forces on the mixture. The shearing forces have the purpose of opening up the phyllosilicates as completely as possible into individual platelets.

During the subsequent shaping process, preferably an extrusion process, it is then possible to orientate the platelets of the phyllosilicates by means of the shearing forces and the shaping forces acting perpendicular to them. This orientation increases the mechanical strength. For application as heat insulating material, it is helpful in lowering the thermal conductivity. In addition, the requirement for phyllosilicates, in order to achieve the same physical properties, is smaller.

In many cases, an excessively strong orientation is undesirable. By replacing all or some of the unfired phyllosilicates by calcined phyllosilicates, orientation can be prevented.

Because of their plastic properties, phyllosilicates can be mixed with water in such a way that they are capable of being extruded. The water content should be adjusted so that good formability of the mixture is ensured. The water content must be raised according to the capacity of the aerogel to absorb water.

The shaping process can, however, also be carried out using other methods known to the person skilled in the art. Thus, the mixture, if it preferably has a viscosity in the range from 100 to 2000 mPas, can also be poured into a mold.

The article obtained in the shaping process is dried and then, if required, subjected to green machining, i.e. trimmed to the desired size.

Depending on the application, the dried article can be subjected to heat treatment, i.e. to firing or to calcination. Firing enables the extrusion aids to be removed from the material. The firing temperature is preferably in the range from 500 to 1000° C.

The strength after firing, during which a temperature of 1000° C. should preferably not be exceeded so as not to destroy the structure of the aerogel, is still sufficiently high, despite the high aerogel content, for handling in further operations or in the application.

The novel composite materials are suitable, because of their low thermal conductivity, as shaped articles for heat insulation. If the finished shaped article includes no organic constituents, it can be used for heat insulation even at temperatures above about 500° C. Depending on application, the article can be designed as sheets, strips or irregularly shaped bodies.

The novel composite materials have furthermore also proven successful as shaped articles or coatings for applications in the electronics sector, preferably at frequencies >1 MHz. As the aerogel proportion rises, the dielectric constant of the shaped article falls, and the article can be used as substrate for GHz circuits. This makes possible a high degree of integration of the circuits, because the dielectric constant is small. For applications in the electronics sector, preference is given to the use of composite materials consisting solely of phyllosilicates and at most a small proportion of inorganic binders, since binders of this type based on cement, lime and/or gypsum increase the dielectric constant much more sharply than do phyllosilicates. The use of synthetic phyllosilicates, such as, for example, magadiite or kenyaite, is particularly advantageous, because these can be produced in such a way that they include no alkali metals.

The invention is described in greater detail below by working examples; a hydrophobic aerogel based on tetraethyl orthosilicate (TEOS) and having a density of 0.17 g/cm$^3$ and a thermal conductivity of 30 mW/mK, prepared from trimethylchlorosilane analogously to the process published in WO 94/25149, was used in all experiments.

EXAMPLE 1

The following constituents are mixed in dry form in a mixer:
500 ml of aerogel having a particle size <0.1 mm
450 g of SAVC clay (R3, AGS Minerals)
50 g of bentonite G 100
20 g of tylose FL 6000×

Mixing is continued until the mixture appears homogeneous, i.e. the individual constituents cannot be differentiated with the naked eye. The mixture is then moistened with the following liquids:
225 ml of water
25 ml of MobilcerX
25 ml of Baykiesol The finished mixture is degassed and then extruded to form molded pieces. The molded pieces are dried and then subjected to high-temperature treatment at 500° C. in order to remove the organic constituents.

The molded pieces of composite material which are obtained have a density of 0.8 g/cm$^3$ and a dielectric constant of 2.7.

EXAMPLE 2

The following constituents are mixed in dry form in a mixer:
1000 ml of aerogel
250 g of bentonite G 100
40 g of tylose FL 6000×

Mixing is continued until the mixture appears homogeneous, i.e. the individual constituents cannot be differentiated with the naked eye. The mixture is then moistened with the following liquids:
200 ml of water
50 ml of MobilcerX
50 ml of Baykiesol The finished mixture is degassed and then extruded to form molded pieces. The molded pieces are dried and then subjected to a high-temperature treatment at 600° C. in order to remove the organic constituents.

The molded pieces obtained have a density of 0.55 g/cm$^3$.

EXAMPLE 3

The following constituents are mixed in dry form in a mixer:
500 ml of aerogel
450 g of clay MF 35
50 g of bentonite G 100
20 g of tylose FL 6000×

Mixing is continued until the mixture appears homogeneous, i.e. the individual constituents cannot be differentiated with the naked eye. The mixture is then moistened with the following liquids:
225 ml of water
25 ml of MobilcerX
25 ml of Baykiesol The finished mixture is degassed and then extruded to form molded pieces. The molded pieces are dried and then subjected to a high-temperature treatment at 500° C. in order to remove the organic constituents.

The molded pieces obtained have a density of 0.8 g/cm$^3$.

EXAMPLE 4

The following constituents are mixed in dry form in a mixer:
1000 ml of aerogel
250 g of bentonite G 100
40 g of tylose FL 6000×

Mixing is continued until the mixture appears homogeneous, i.e. the individual constituents cannot be differentiated with the naked eye. The mixture is then moistened with the following liquids:
200 ml of water
50 ml of MobilcerX
50 ml of Baykiesol The finished mixture is degassed and then extruded to form molded pieces. The molded pieces are dried and then subjected to a high-temperature treatment at 630° C. in order to remove the organic constituents.

The molded pieces obtained have a density of 0.55 g/cm$^3$.

EXAMPLE 5

1000 ml of aerogel
200 g of calcium silicate (portlandite)
20 g of gypsum α-hemihydrate
50 g of SAVC clay
40 g of tylose FL 6000×
275 ml of water are mixed in a container, using a stirring device, until the mixture appears homogeneous, i.e. the individual constituents cannot be differentiated with the naked eye.

The mixture is poured into a mold and left there for 48 hours, and then removed. The shaped article is dried at 50° C. in order to remove excess moisture. The dried shaped article has a density of 0.65 g/cm$^3$, a thermal conductivity of 0.25 W/mK (determined by the laser flash method using Netzsch equipment), and a flexural strength (determined according to DIN 40685/IEC 672; Part 2) of 35 N/mm$^2$.

EXAMPLE 6

The following constituents are mixed in dry form in a mixer:
500 ml of aerogel
450 g of SAVC clay
50 g of bentonite G 100
50 g of tylose FL 6000×

Mixing is continued until the mixture appears homogeneous, i.e. the individual constituents cannot be differentiated with the naked eye. The mixture is then moistened with the following liquids:
225 ml of water
25 ml of MobilcerX
25 ml of Baykiesol The finished mixture is dried and then subjected to comminution in a jaw breaker to <1.5 mm. The powder obtained is milled in two passes in an Alpine cross beater mill having a four-blade beater. The powder has a mean particle size of <0.1 mm.

This powder is granulated in an Eirich pan granulator, at an angle of 40° and a rotation rate of 20 rpm. A 0.2% strength tylose C600 solution is used for granulation. The granules are sieved to particle sizes >0.1 mm and <0.8 mm, and dry-pressed with 2.5% moisture in a DORST TPA-6 to give flexural test specimens of 4.5×4.5×50 mm and discs of diameter 50×7 mm.

The molded pieces obtained have a density of 1.0 $g/cm^3$, a thermal conductivity of 400 mW/mK and a flexural strength of >35 $N/mm^2$.

What is claimed is:

1. A composite material consisting of
   from about 10 to 95% by volume of aerogel particles,
   at least one inorganic matrix material, and
   optionally, fibers, auxiliary materials, IR opacifiers and further inorganic binders;
   wherein the particle diameter of the aerogel particles is less than 0.5 mm and the inorganic matrix material is a phyllosilicate.

2. A composite material as claimed in claim 1, wherein the phyllosilicate is a naturally occurring phyllosilicate.

3. A composite material as claimed in claim 1 wherein the further inorganic binders are cement, lime and/or gypsum.

4. A composite material as claimed in claim 1, wherein the aerogel is an $SiO_2$ aerogel.

5. A composite material as claimed in claim 1, wherein the aerogel particles have hydrophobic surface groups.

6. A composite material as claimed in claim 1, wherein the particle diameter of the aerogel particles is less than 0.2 mm.

7. A composite material as claimed in claim 1, wherein the aerogel particles have porosities greater than 60% and densities less than 0.6 $g/cm^2$.

8. A composite material as claimed in in claim 1, wherein the composite material includes from 0.1 to 30% by volume of fibers.

9. A composite material as claimed in in claim 1, wherein the composite material also contains auxiliary materials.

10. A composite material as claimed in claim 1, wherein the composite material is in the shape of a sheet and is laminated, on at least one side, with at least one covering layer.

11. A process for producing a composite material as claimed in claim 1, which comprises
    a) mixing the aerogel particles, the phyllosilicate, water and, optionally, fibers, binders and/or auxiliary materials in a mixing device,
    b) subjecting the mixture thus obtained to a shaping process,
    c) drying the body thus obtained,
    d) if desired, subjecting the dried body to green machining, and
    e) subjecting the machined and/or dried body, if desired, to a heat treatment at a temperature in the range from 250 to 1200° C.

12. The process as claimed in claim 11, wherein the shaping is carried out by extrusion.

13. The process as claimed in claim 11, wherein the heat treatment is carried out at a temperature in the range from 500 to 1000° C.

14. In a method for heat insulation or for electrical coating of an article, the improvement which comprises applying composite material according to claim 1 to said article.

* * * * *